United States Patent
Nakashima et al.

(10) Patent No.: US 10,004,111 B2
(45) Date of Patent: Jun. 19, 2018

(54) IN-VEHICLE RADIANT HEATER CONTROL APPARATUS

(71) Applicant: DENSO CORPORATION, Kariya, Aichi-pref. (JP)

(72) Inventors: Masatoshi Nakashima, Kariya (JP); Takuya Kataoka, Kariya (JP); Kimitake Ishikawa, Kariya (JP); Yasuhiro Sagou, Kariya (JP); Asami Takahashi, Kariya (JP); Hiroyuki Sakane, Kariya (JP); Akira Oga, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 118 days.

(21) Appl. No.: 14/912,116

(22) PCT Filed: Jul. 1, 2014

(86) PCT No.: PCT/JP2014/003502
§ 371 (c)(1),
(2) Date: Feb. 15, 2016

(87) PCT Pub. No.: WO2015/029299
PCT Pub. Date: Mar. 5, 2015

(65) Prior Publication Data
US 2016/0200172 A1    Jul. 14, 2016

(30) Foreign Application Priority Data

Aug. 27, 2013 (JP) .................................. 2013-175836
Jun. 5, 2014 (JP) .................................. 2014-116951

(51) Int. Cl.
*H05B 1/02* (2006.01)
*B60H 1/22* (2006.01)
(Continued)

(52) U.S. Cl.
CPC ......... *H05B 1/0236* (2013.01); *B60H 1/2218* (2013.01); *B60H 1/2225* (2013.01);
(Continued)

(58) Field of Classification Search
CPC .............. H05B 1/0236; H05B 1/00742; H05B 2203/032; B60H 1/2218; B60H 1/2225;
(Continued)

(56) References Cited

U.S. PATENT DOCUMENTS 9,769,879 B2 *  9/2017  Ota ...................... H05B 3/0042
9,873,308 B2 *  1/2018  Moench ............... B60H 1/2215
(Continued)

FOREIGN PATENT DOCUMENTS

CN     203340313 U  *  12/2013
EP       0538131 A1  *   4/1993  ........... B60H 1/2225
(Continued)

OTHER PUBLICATIONS

Iwamura, Yoshiaki, "Touch", ISBN 4260118552, Mar. 2001, pp. 50-52.
International Search Report and Written Opinion (in Japanese with English Translation) for PCT/JP2014/003502, dated Oct. 7, 2014; ISA/JP.

*Primary Examiner* — Gregory Huson
*Assistant Examiner* — Daniel E Namay
(74) *Attorney, Agent, or Firm* — Harness, Dickey & Pierce, P.L.C.

(57) ABSTRACT

An in-vehicle radiant heater control apparatus includes: a temperature detection device for a heater in a vehicle compartment; a first switch element connected in series to the radiant heater between a power supply and a ground; a temperature control device controlling the first switch element that the heater temperature approaches a target temperature; a resistive element having one electrode connected to one electrode of the heater; an inter-electrode voltage detection device for the resistive element; and a resistance (Continued)

calculation device repeatedly obtaining a heater resistance of the radiant heater based on a voltage between the other electrode of the resistive element and the other electrode of the heater, a detected resistance voltage, and a resistance of the resistive element. The temperature detection device obtains the heater temperature based on the heater resistance.

11 Claims, 8 Drawing Sheets

(51) Int. Cl.
  *F24H 3/00* (2006.01)
  *B60H 1/00* (2006.01)
(52) U.S. Cl.
  CPC ......... *F24H 3/002* (2013.01); *B60H 1/00742* (2013.01); *B60H 2001/224* (2013.01); *B60H 2001/2256* (2013.01); *H05B 2203/032* (2013.01)
(58) Field of Classification Search
  CPC .......... B60H 2001/224; B60H 1/00742; F24H 3/002
  USPC ................................................ 237/5, 12, 81
  IPC ......... H05B 1/02; B60H 1/22,1/00; F24H 3/00
  See application file for complete search history.

(56) References Cited

U.S. PATENT DOCUMENTS

| | | | |
|---|---|---|---|
| 2007/0272398 A1* | 11/2007 | Chan | F24C 7/04 165/185 |
| 2009/0084771 A1 | 4/2009 | Nomura | |
| 2010/0187211 A1* | 7/2010 | Eisenhour | B60H 1/00742 219/202 |
| 2012/0061365 A1* | 3/2012 | Okamoto | B60H 1/2225 219/202 |
| 2013/0068440 A1 | 3/2013 | Kamiyama | |
| 2015/0110477 A1* | 4/2015 | Ota | B60H 1/2215 392/435 |
| 2015/0139271 A1* | 5/2015 | Lee | B60R 13/025 374/121 |

FOREIGN PATENT DOCUMENTS

| | | | | |
|---|---|---|---|---|
| JP | H01244515 A | 9/1989 | | |
| JP | H09202130 A | 8/1997 | | |
| JP | 2007059097 A | 3/2007 | | |
| JP | 2008213661 A | 9/2008 | | |
| JP | 2009086963 A | 4/2009 | | |
| JP | 2009125190 A | 6/2009 | | |
| JP | 2011018494 A | 1/2011 | | |
| JP | 2011246091 A | 12/2011 | | |
| JP | 2012228896 A * | 11/2012 | ............. | F24D 13/02 |
| JP | 2015063293 A * | 4/2015 | ............ | H05B 1/0236 |

* cited by examiner

IN-VEHICLE RADIANT HEATER CONTROL APPARATUS

CROSS REFERENCE TO RELATED APPLICATIONS

This application is a U.S. National Phase Application under 35 U.S.C. 371 of International Application No. PCT/JP2014/003502 filed on Jul. 1, 2014 and published in Japanese as WO 2015/029299 A1 on Mar. 5, 2015. This application is based on and claims the benefit of priority from Japanese Patent Applications No. 2013-175836 filed on Aug. 27, 2013, and No. 2014-116951 filed on Jun. 5, 2014. The entire disclosures of all of the above applications are incorporated herein by reference.

TECHNICAL FIELD

The present disclosure relates to an in-vehicle radiant heater control apparatus.

BACKGROUND ART

In the related art, a vehicle heating apparatus, which offers pleasant heating performance to occupants using a radiant heater that is provided in a vehicle cabin and radiates radiant heat to the occupants, is disclosed (for example, refer to Patent Literature 1).

Typically, a thermistor is used as a sensor that detects the temperature of a target for temperature measurement.

The inventors have examined a vehicle heating apparatus in which a thermistor is disposed in the vicinity of a radiant heater so as to detect the temperature of the radiant heater, and based on the temperature detected by the thermistor, control is performed such that the temperature of the radiant heater approaches a target temperature.

According to the examination done by the inventors, the thermal time constant of the thermistor causes a delay in the measurement of temperature. For this reason, the thermistor cannot accurately detect an instantaneous change in the temperature of the radiant heater. Accordingly, a delay in controlling the temperature of the radiant heater occurs.

PRIOR ART LITERATURES

Patent Literature

Patent Literature 1: JP-2011-246091

SUMMARY OF INVENTION

It is an object of the present disclosure to provide an in-vehicle radiant heater control apparatus that reduces a delay time occurring in the obtainment of the temperature of a radiant heater, and controls the temperature of the radiant heater with high accuracy.

According to an example aspect of the present disclosure, an in-vehicle radiant heater control apparatus includes: a temperature detection device that repeatedly obtains heater temperature of a radiant heater for radiating radiant heat to an occupant in a compartment of a vehicle; a first switch element that is disposed between a power supply and a ground, and is connected in series to the radiant heater; a temperature control device that controls the first switch element based on the heater temperature detected by the temperature detection device every time the temperature detection device obtains the heater temperature of the radiant heater, and controls an electric power to be supplied from the power supply to the radiant heater via the first switch element in such a way that the heater temperature of the radiant heater approaches a target temperature; a resistive element that has a first electrode and a second electrode, one of which is connected to one of two electrodes of the radiant heater; an inter-electrode voltage detection device that detects a resistance voltage between the first electrode and the second electrode of the resistive element; and a resistance value calculation device that repeatedly obtains a heater resistance value of the radiant heater based on a voltage between the other of the first electrode and the second electrode of the resistive element and the other of the two electrodes of the radiant heater, the resistance voltage detected by the inter-electrode voltage detection device, and a resistance value of the resistive element. The temperature detection device obtains the heater temperature of the radiant heater based on the heater resistance value obtained by the resistance value calculation device.

The in-vehicle radiant heater control device obtains the resistance value of the radiant heater based on the voltage between the other electrode of the first and second electrodes of the resistive element and the other electrode of the two electrodes of the radiant heater, the voltage detected by the inter-electrode voltage detection device, and the resistance value of the resistive element. For this reason, the resistance value of each of the radiant heaters can be obtained regardless of the thermal time constant of a thermistor. Accordingly, a delay time occurring in the obtainment of the temperature of each of the radiant heaters can be reduced. Since the temperature of the radiant heater is obtained based on the obtained resistance value of the radiant heater, a change in the temperature of the radiant heater can be accurately detected. As a result, the temperatures of the radiant heaters can be controlled with high accuracy.

Alternatively, the in-vehicle radiant heater control apparatus may further include: a constant-voltage circuit that outputs a constant voltage to the radiant heater; a second switch element that is disposed between the constant-voltage circuit and the radiant heater; a first switch control device that controls the first switch element that the radiant heater is disconnected from the power supply; and a second switch control device that controls the second switch element that the radiant heater is connected to the constant-voltage circuit. The resistive element is disposed between the constant-voltage circuit and the radiant heater, and provides a first resistive element. The inter-electrode voltage detection device detects the resistance voltage between the first electrode and the second electrode of the first resistive element in a state where the first switch control device controls the first switch element to disconnect between the radiant heater and the power supply, and the second switch control device controls the second switch element to connect between the radiant heater and the constant-voltage circuit. The resistance value calculation device obtains the heater resistance value of the radiant heater based on the resistance voltage detected by the inter-electrode voltage detection device, a first resistance value of the first resistive element, and an output constant voltage of the constant-voltage circuit. At this time, the resistance value calculation device obtains the resistance value of the radiant heater in a state where current flows from the constant-voltage circuit to the ground via the first resistive element and the radiant heater. For this reason, the output voltage of the constant-voltage circuit can be set in such a way that the temperature of the radiant heater is restricted from increasing. As a result, accuracy in the calculation of the resistance value of the radiant heater can be improved.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, embodiments of this disclosure will be described with reference to the accompanying drawings. In the embodiments to be described hereinbelow, for the purpose of simplifying the description, the like reference signs will be assigned to the like or the equivalent portions.

First Embodiment

Figure 1:
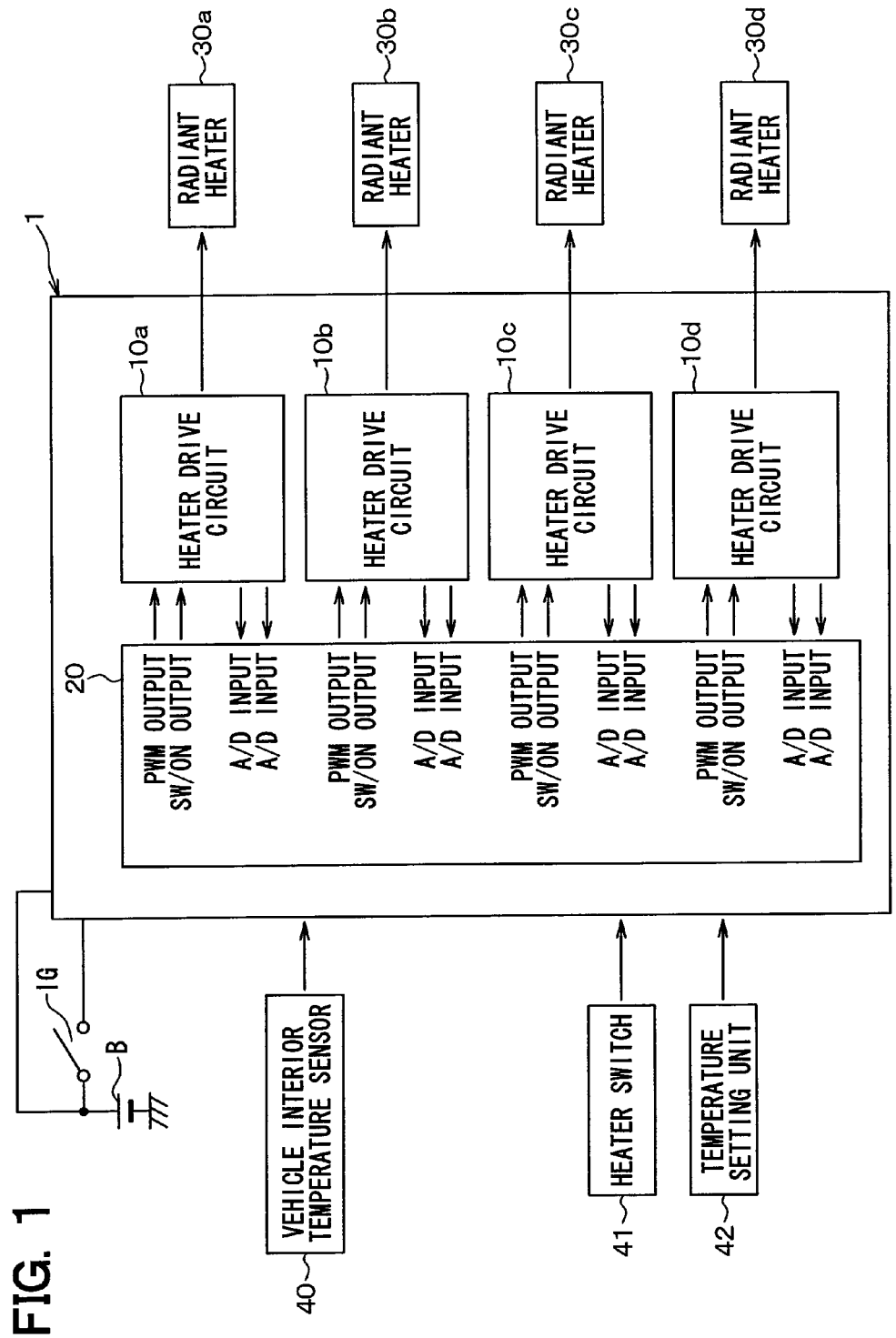
FIG. 1 is a block diagram illustrating an electric circuit configuration of an in-vehicle radiant heater control apparatus in a first embodiment of this disclosure.

FIG. 1 illustrates an electric circuit diagram of an in-vehicle radiant heater control apparatus 1 in a first embodiment of this disclosure.

The in-vehicle radiant heater control apparatus 1 in this embodiment includes heater drive circuits 10a to 10d, and a microcomputer 20. The heater drive circuits 10a to 10d control the temperatures of the radiant heaters corresponding to radiant heaters 30a to 30d.

The heater drive circuit 10a corresponds to the radiant heater 30a, and the heater drive circuit 10b corresponds to the radiant heater 30b. The heater drive circuit 10c corresponds to the radiant heater 30c, and the heater drive circuit 10d corresponds to the radiant heater 30d.

The heater drive circuits 10a to 10d correspond to different radiant heaters, respectively, and have the same circuit configuration. The circuit configuration of each of the heater drive circuits 10a to 10d will be described in detail later.

Figure 2:
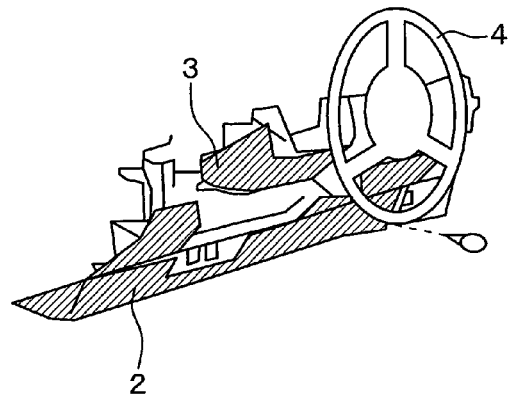
FIG. 2 is a view illustrating the disposition of radiant heaters in FIG. 1.

In this embodiment, as illustrated in FIG. 2, the radiant heaters 30a to 30d are disposed on a surface of an undercover 2 or a surface of a column cover 3 of the dashboard in a vehicle cabin, and radiate radiant heat to an occupant (specifically, a driver) in the vehicle cabin. Reference sign 4 in FIG. 2 represents a steering wheel.

A microcomputer 20 in FIG. 1 is configured to include a CPU, a ROM, a RAM, a flash memory, an A/D converter, a timer, and the like, and executes a computer program. When executing the computer program, the microcomputer 20 executes a main temperature control process for each of the radiant heaters based on output signals from a vehicle interior temperature sensor 40, a heater switch 41, a temperature setting unit 42, an ignition switch IG. The main temperature control process is a control process by which the temperature of each of the radiant heaters 30a to 30d approaches a target temperature thereof, which will be described later.

In this embodiment, the flash memory stores the computer program, the resistance value of a shunt resistor 52, theoretical resistance value vs. temperature characteristics Ga (to be described later) of the radiant heater 30a in advance. A memory for storing the computer program and the theoretical resistance value vs. temperature characteristics Ga is not limited to the flash memory.

The timer is used to determine a timing when the resistance value of each of the radiant heaters 30a to 30d is calculated. The vehicle interior temperature sensor 40 is a temperature sensor that detects a vehicle cabin air temperature.

The heater switch 41 is a switch that is operated by an occupant to cause the radiant heaters 30a to 30d to start radiating radiant heat. The temperature setting unit 42 is a switch that is operated by an occupant so as to set a target temperature (set temperature) TSET for the radiant heaters 30a to 30d. The ignition switch IG is a power supply switch for starting up a travel engine. Reference sign B in FIG. 1 represents a battery (power supply).

Hereinafter, in this embodiment, the circuit configuration of the heater drive circuit 10a of the heater drive circuits 10a to 10d will be representatively described with reference to FIG. 3.

Figure 3:
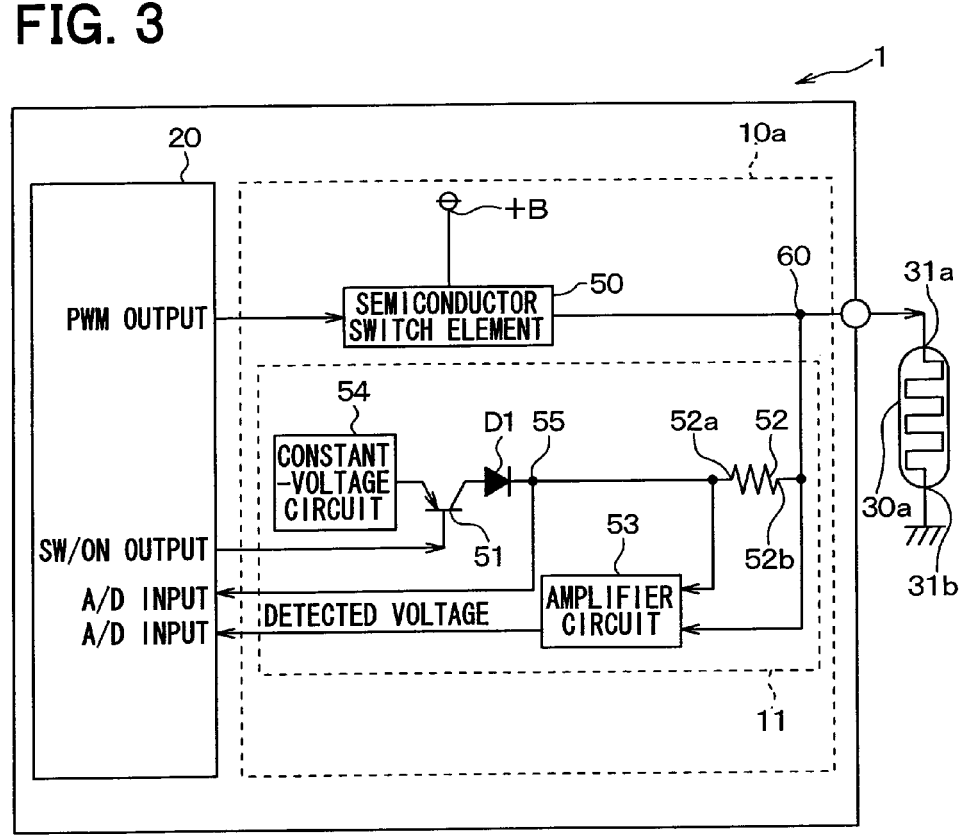
FIG. 3 is a circuit diagram illustrating a detailed configuration of a heater drive circuit in FIG. 1.

As illustrated in FIG. 3, the heater drive circuit 10a includes a semiconductor switch element 50 and a detection circuit 11. The semiconductor switch element 50 is a first switch element that is disposed between a positive electrode (which is denoted by +B in FIG. 3) of the battery and an electrode 31a of the radiant heater 30a. An electrode 31b of the radiant heater 30a is connected to a negative electrode (ground) of the battery. The semiconductor switch element 50 is repeatedly turned on and off in response to a PWM output signal output from the microcomputer 20.

In this embodiment, transistors such as an insulated gate bipolar transistor (IGBT) and a metal-oxide-semiconductor field-effect transistor (MOSFET) can be used as the semiconductor switch element 50.

The detection circuit 11 is an element configured to obtain the temperature of the radiant heater 30a, and includes a semiconductor switch element 51; a shunt resistor 52; an amplifier circuit 53; a diode D1; and a constant-voltage circuit 54.

An electrode 52a of the shunt resistor 52 is connected to an output terminal of the constant-voltage circuit 54. An electrode 52b of the shunt resistor 52 is connected to the electrode 31a of the radiant heater 30a via a common connection terminal 60. The common connection terminal 60 is a common connection terminal between the semiconductor switch element 50 and the radiant heater 30a. The shunt resistor 52 is a first resistive element that is used to detect current flowing from the constant-voltage circuit 54 to the radiant heater 30a.

The constant-voltage circuit 54 outputs a predetermined constant voltage to the shunt resistor 52 and the radiant heater 30a based on electrical power supplied from the battery. The semiconductor switch element 51 is a second switch element that is connected between the output terminal of the constant-voltage circuit 54 and the electrode 52a of the shunt resistor 52. The semiconductor switch element 51 is controlled by the microcomputer 20 such that the constant-voltage circuit 54 is connected to or disconnected from the shunt resistor 52. In this embodiment, transistors such as an insulated gate bipolar transistor (IGBT) and a metal-oxide-semiconductor field-effect transistor (MOSFET) can be used as the semiconductor switch element 51.

The amplifier circuit 54 amplifies the voltage between the electrodes 52a and 52b of the shunt resistor 52, and outputs the amplified voltage to the microcomputer 20. The diode D1 is connected between the semiconductor switch element 51 and the shunt resistor 52.

The constant-voltage circuit 54 outputs an output voltage to the microcomputer 20 via a common connection terminal 55 that is disposed between the diode D1 and the shunt resistor 52.

In this embodiment, the resistance value of the shunt resistor 52 and the output voltage of the constant-voltage circuit 54 are set in such a way that an amount of increase in the temperature of each of the radiant heaters 30a to 30d when the resistance value of the corresponding one of the radiant heaters 30a to 30d is detected becomes an amount of temperature increase which cannot be sensed with the skin on the palm of an occupant's hand.

In the microcomputer 20 in FIGS. 1 and 3, the term "PWM output" represents an output terminal through which a PWM control signal is output to the semiconductor switch element 50. The term "A/D input" represents an input terminal through which an analog signal for the output voltage of the amplifier circuits 53 and 71 or an output voltage from the common connection terminal 55 is input to the microcomputer 20. The term "SW/ON output" represents an output terminal through which a control signal is output to the semiconductor switch element 51.

Hereinafter, the operation of the in-vehicle radiant heater control apparatus 1 in this embodiment will be described.

The microcomputer 20 executes the main temperature control process for each of the radiant heaters 30a to 40d in a time-division manner. The same main temperature control process is executed for the radiant heaters. Hereinafter, the main temperature control process for the radiant heater 30a executed by the microcomputer 20 will be described.

Figure 4:
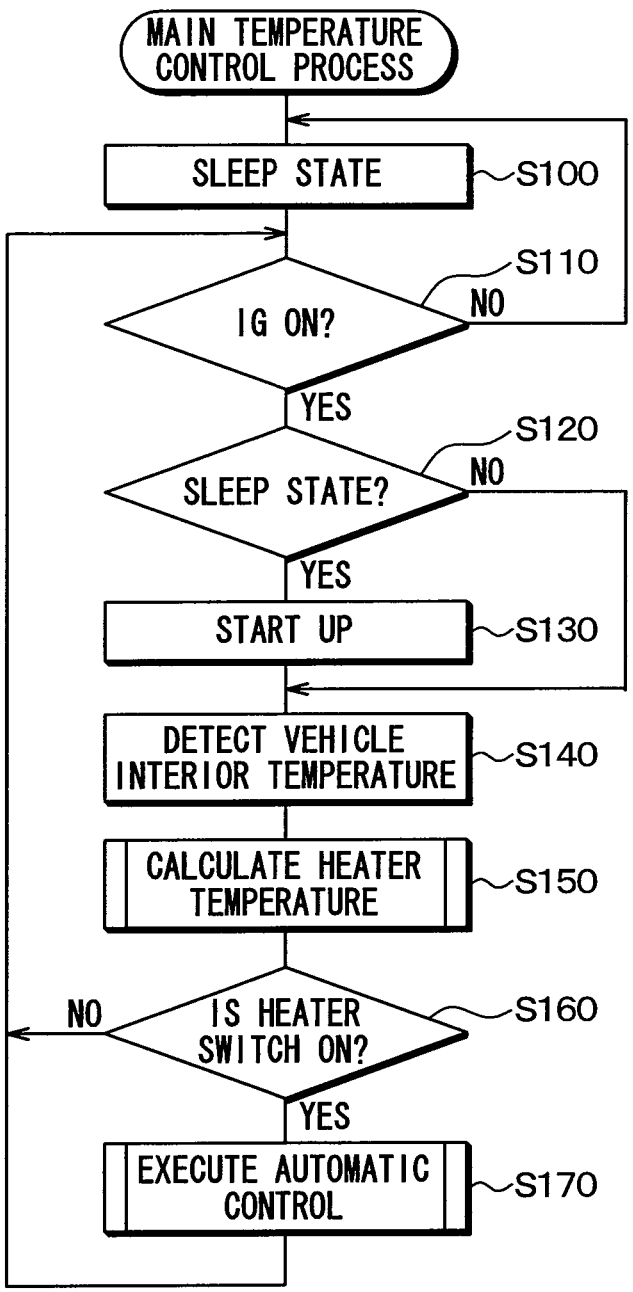
FIG. 4 is a flowchart illustrating a main temperature control process executed by a microcomputer in FIG. 1.
Figure 5:
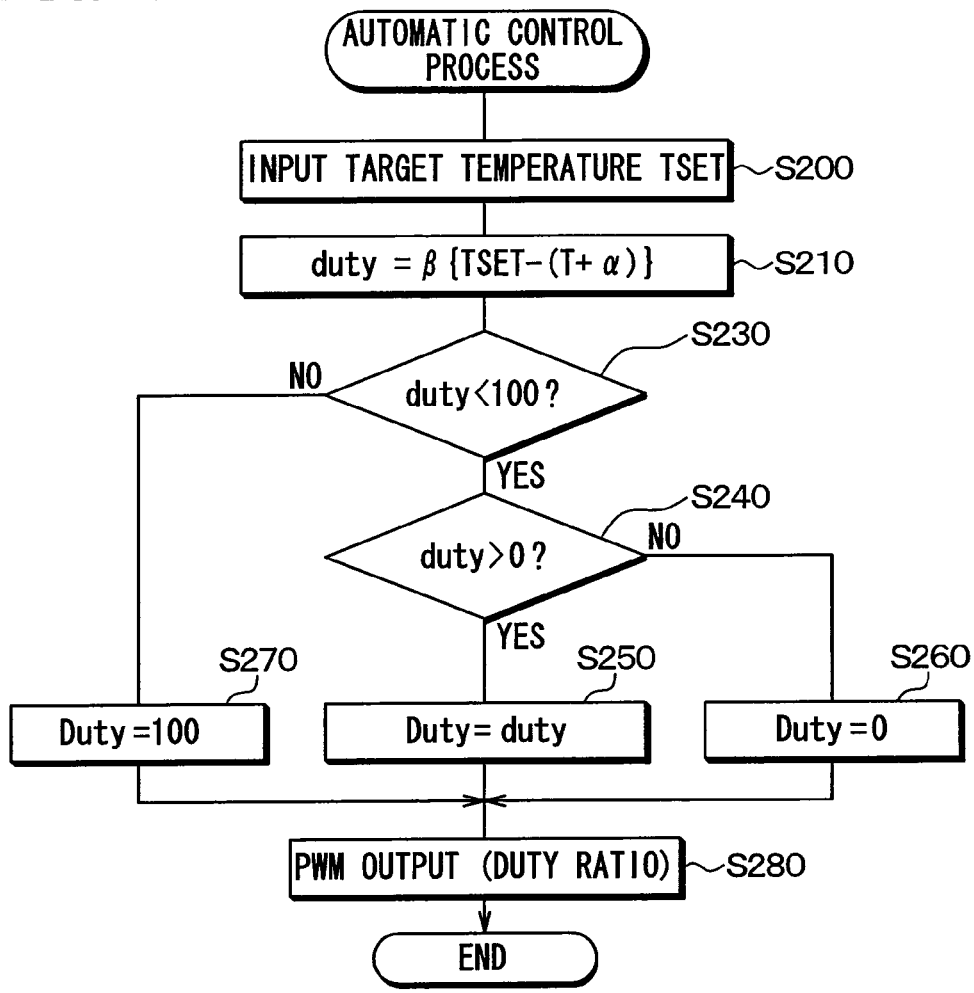
FIG. 5 is a flowchart illustrating an automatic control process in FIG. 4.
Figure 6:
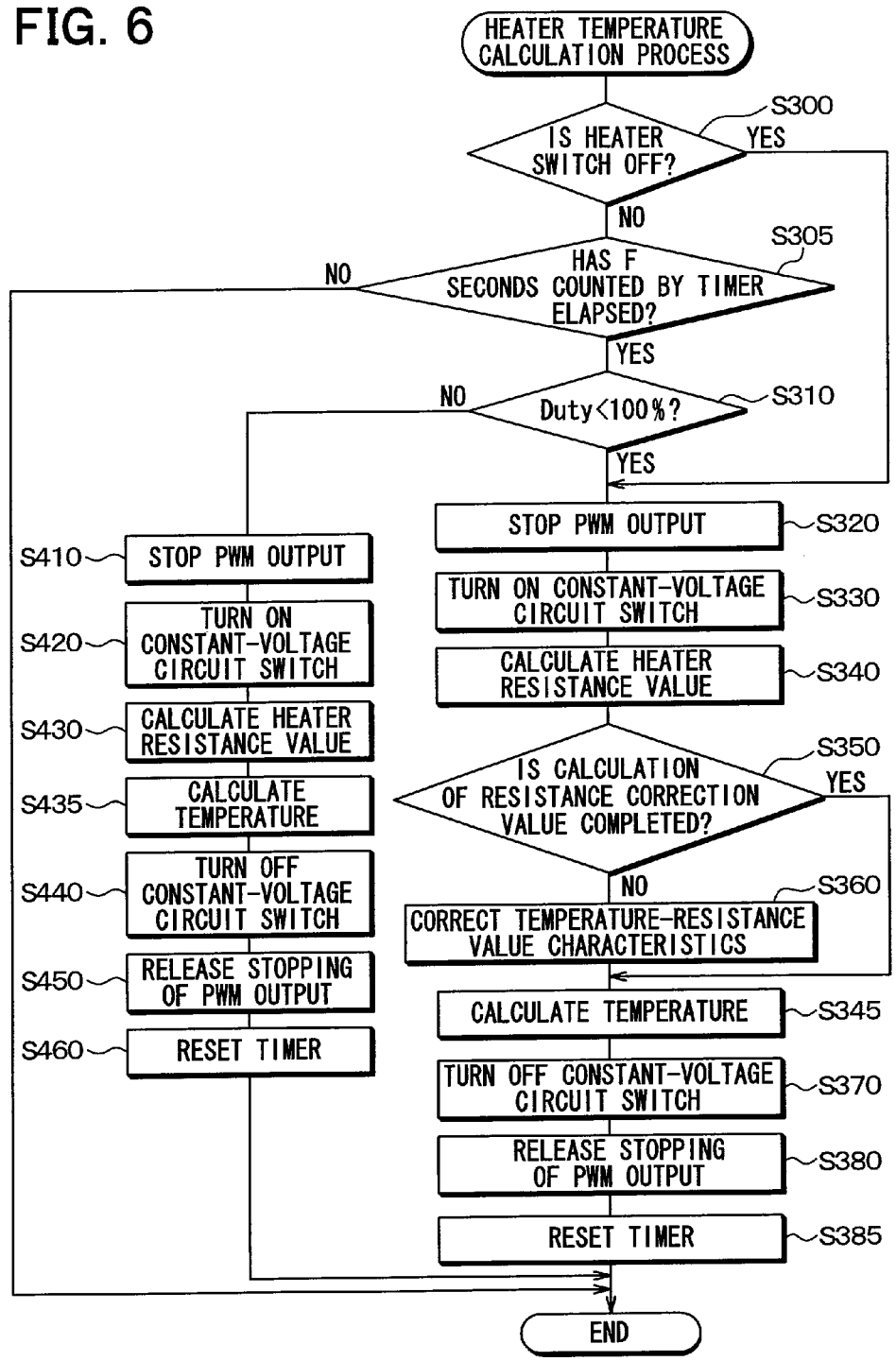
FIG. 6 is a flowchart illustrating a heater temperature calculation process in FIG. 4.
Figure 7:
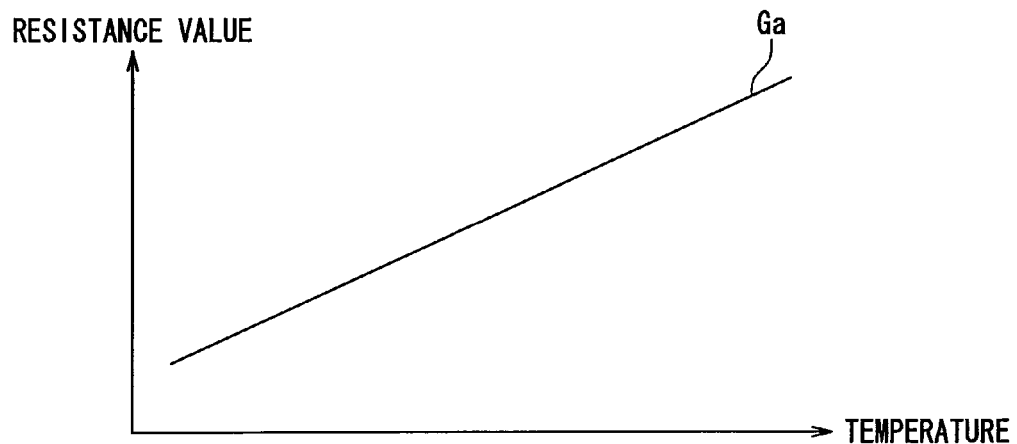
FIG. 7 is a graph illustrating a relationship between the temperature and the resistance value of the radiant heater in FIG. 1.

The microcomputer 20 executes the main temperature control process according to flowcharts illustrated in FIGS. 4 to 6. FIG. 4 is a flowchart illustrating the main temperature control process. FIG. 5 is a flowchart illustrating details of an automatic control process in FIG. 4. FIG. 6 is a flowchart illustrating details of a heater temperature calculation process in FIG. 4.

The microcomputer 20 starts to execute the main temperature control process when the microcomputer 20 is connected to the battery, and electrical power is supplied from the battery to the microcomputer 20. Hereinafter, the main temperature control process executed by the microcomputer 20 will be described.

First, in step 100, the timer and the like are reset, the microcomputer 20 enters a sleep state so as to restrict the microcomputer 20 from consuming electrical power. Thereafter, in step 110, it is determined whether the ignition switch IG is turned on.

When the ignition switch IG is turned off, the determination in step 110 is NO. Then, the process returns to step 100. For this reason, when the ignition switch IG is turned off, the determination in step 110 is NO, and the sleep state is maintained. Thereafter, when the ignition switch IG is turned on, the determination in step 110 is YES, the process proceeds to step 120, and it is determined whether the microcomputer 20 is in a sleep state. When an external interrupt signal or the like is input to the microcomputer 20, and the microcomputer 20 is started up, the determination in step 120 is NO, and the process proceeds to step 140.

In contrast, when the microcomputer 20 is in a sleep state, the determination in step 120 is YES, the process proceeds to step 130, and the microcomputer 20 is started up. Then, the process proceeds to the next step 140.

In step 140, the vehicle interior temperature sensor 40 detects a vehicle interior air temperature. Then, in step 150, the heater temperature calculation process, by which a temperature T of the radiant heater 30a is calculated, is executed. The details of the heater temperature calculation process will be described later.

Subsequently, in step 160, it is determined whether the heater switch 41 is turned on. When the heater switch 41 is turned on, the determination in step 160 is YES. That is, it is determined that an occupant operates the heater switch 41 to cause the radiant heater 30a to start radiating radiant heat. Then, the process proceeds to step 170, and the automatic control process by which the temperature of the radiant heater 30a is automatically controlled is executed. The automatic control process is a process by which the semiconductor switch element 50 is PWM controlled such that the supply of electrical power from the battery to the radiant heater 30a is controlled.

Thereafter, the process proceeds to step 110. For this reason, when the ignition switch IG and the heater switch 41 are turned on, a "YES" determination in step 110, a "YES" determination in step 120, steps 130 to 150, a "YES" determination in step 160, and step 170 are repeated. Accordingly, the automatic temperature control of the radiant heater 30a is continuously executed.

In step 160, when the heater switch 41 is turned off, it is determined that the occupant does not operate the heater switch 41 such that the radiant heater 30a starts radiating radiant heat, and the determination is NO.

In this case, the process proceeds to step 110. For this reason, when the ignition switch IG is turned on, and the heater switch 41 is turned off, a "YES" determination in step 110, a "YES" determination in step 120, steps 130 to 150, and a "NO" determination in step 160 are repeated. For this reason, the automatic temperature control of the radiant heater 30a is prevented from being executed.

Hereinafter, the automatic control process in this embodiment will be described with reference to FIG. 5.

First, in step 200, the microcomputer 20 reads a target temperature TSET for the radiant heater 30a from the temperature setting unit 42.

Hereinafter, in step 210, a duty ratio for the PWM control of the semiconductor switch element 50 is calculated.

When a time (Ton+Toff), which is the sum of an ON time Ton and an OFF time Toff of the semiconductor switch element 50, is assumed to be a given period TS, the duty ratio represents the ratio in percentage {=(Ton/(Ton+Toff))× 100%} of the ON time Ton to the period (Ton+Toff).

In this embodiment, the duty ratio (which is denoted by "duty" in FIG. 5) is obtained by substituting the temperature T and the target temperature TSET of the radiant heater 30a calculated in the heater temperature calculation process (step 150) into Expression 1. β and α in Expression 1 represent a coefficient, and a correction value, respectively.

$$\text{Duty ratio} = \beta\{TSET-(T+\alpha)\} \quad \text{Expression 1}$$

Hereinafter, the duty ratio obtained in step 210 is normalized in steps 230 to 270. Hereinafter, for descriptive purposes, the duty ratio (that is, a duty ratio which is not normalized yet) calculated in step 210 is denoted by a duty ratio "duty", and a normalized duty ratio is denoted by a duty ratio "Duty".

Specifically, it is determined whether the duty ratio "duty" calculated in step 210 is less than 100% (step 230).

When the duty ratio "duty" is less than 100% ("duty"<100%), the determination in step 230 is YES, and the process proceeds to step 240. Then, it is determined whether the duty ratio "duty" is greater than 0%. When the duty ratio "duty" is greater than 0% ("duty">0%), the duty ratio "duty" is set to the duty ratio "Duty" (step 250).

When the duty ratio "duty" is less than or equal to 0% in step 240 ("Duty"≤0%), the duty ratio "Duty" is set to 0% (step 260). In addition, when the duty ratio "Duty" is greater than 100% in step 230, the duty ratio "duty" is set to 100% (step 270).

The duty ratio "Duty" is obtained by normalizing the duty ratio "duty" calculated in step 210 in this manner. The semiconductor switch element 50 is PWM controlled such that the duty ratio "Duty" is realized by the semiconductor switch element 50 (step 280).

Specifically, a PWM control signal with a duty ratio "Duty" is output to a control terminal of the semiconductor switch element 50. Accordingly, the semiconductor switch element 50 is switched on and off, and the supply of electrical power from the battery to the radiant heater 30a via the semiconductor switch element 50 is controlled such that the temperature of the radiant heater 30a approaches the target temperature TSET.

Hereinafter, in this embodiment, the heater control calculation process will be described with reference to FIG. 6.

First, in step 300, it is determined whether the heater switch 41 is turned off. When the heater switch 41 is turned off, it is determined that the occupant does not operate the heater switch 41 such that the radiant heater 30a starts radiating radiant heat, and the determination is YES.

Subsequently, in step 320, the semiconductor switch element 50 is turned off such that the battery is disconnected from the radiant heater 30a. Accordingly, the PWM control of the semiconductor switch element 50 is stopped. Then, the semiconductor switch element 51 is turned on (step 330). Accordingly, the shunt resistor 52 is connected to the constant-voltage circuit 54. Then, current flows from the constant-voltage circuit 54 to the ground via the shunt resistor 52 and the radiant heater 30a.

At this time, the microcomputer 20 reads a voltage output from the amplifier circuit 53, and reads a voltage output from the common connection terminal 55. The output voltage of the amplifier circuit 53 represents a voltage between the electrodes 52a and 52b of the shunt resistor (the first resistive element) 52. The output voltage from the common connection terminal 55 represents an output voltage which is output from the constant-voltage circuit 54, and is applied between the electrode 52a of the shunt resistor 52 and the electrode 31b of the radiant heater 30a. The resistance value of the radiant heater 30a is obtained based on the output voltage of the amplifier circuit 53 which has been read, the output voltage of the constant-voltage circuit 54, and the resistance value of the shunt resistor 52 (step 340).

Specifically, current I flowing through the radiant heater 30a and the shunt resistor 52 is obtained based on the output voltage of the amplifier circuit 53 and the resistance value of the shunt resistor 52. A voltage V between the electrodes 31a and 31b of the radiant heater 30a is obtained based on the output voltage from the common connection terminal 55 and the output voltage of the amplifier circuit 53. A resistance value R (1) of the radiant heater 30a is obtained based on the voltage V between the electrodes 31a and 31b of the radiant heater 30a and the current I. The figure in the parenthesis represents the number of execution of step 340.

Since current flows from the constant-voltage circuit 54 to the ground via the shunt resistor 52 and the radiant heater 30a, the temperature of the radiant heater 30a increases, and but the amount of temperature increase cannot be sensed with the skin on the palm of the occupant's hand.

Subsequently, in step 350, it is determined whether the calculation of a resistance correction value ΔR is completed.

The resistance correction value ΔR is a correction value for the resistance value of the radiant heater 30a, and is calculated in the next step 360. In the next step 360, the resistance correction value ΔR is used to calculate resistance value vs. temperature characteristics G1 of the radiant heater 30a that is actually mounted in a vehicle. That is, in step 350, it is determined whether the resistance value vs. temperature characteristic G1 of the radiant heater 30a is calculated.

The current step 350 is step 350 that is executed for the first time after the in-vehicle radiant heater control apparatus 1 is initially connected to the battery. For this reason, in step 350, it is determined that the resistance correction value ΔR (that is, the resistance value vs. temperature characteristics G1) is not calculated yet, and the determination is NO. At this time, it is determined that the temperature of the radiant heater 30a is equal to the detected temperature (that is, which is an air temperature in the vehicle cabin) from the vehicle interior temperature sensor 40.

For this reason, the output voltage of the amplifier circuit 53, which is used to obtain the resistance value R (1) of the radiant heater 30a in step 340, is an output voltage from the amplifier circuit 53 when it is determined that the temperature of the radiant heater 30a is equal to the vehicle interior air temperature.

The output voltage of the constant-voltage circuit 54b, which is used to obtain the resistance value R (1) of the radiant heater 30a in step 340, is an output voltage from the constant-voltage circuit 54 which is applied to the shunt resistor 52 and the radiant heater 30a when it is determined that the temperature of the radiant heater 30a is equal to the vehicle interior air temperature.

Subsequently, as described below, the resistance value vs. temperature characteristics G1 are calculated using the vehicle cabin air temperature detected by the vehicle interior temperature sensor 40 (step 360). At this time, the detected temperature from the vehicle interior temperature sensor 40 is an air temperature detected by the vehicle interior temperature sensor 40 when it is determined that the temperature of the radiant heater 30a is equal to the vehicle interior air temperature.

Figure 8:
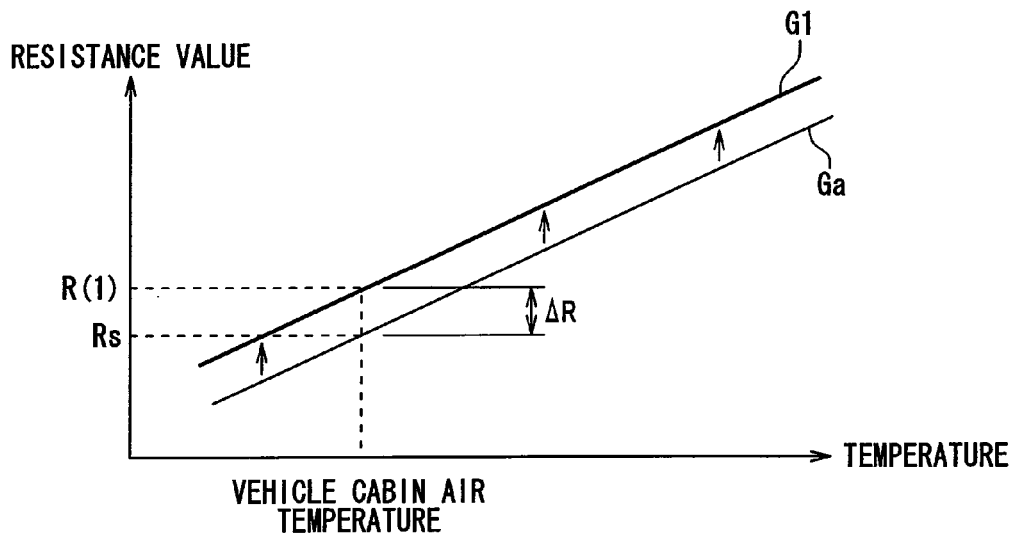
FIG. 8 is a graph illustrating a resistance correction value ΔR for a resistance value with respect to the temperature of the radiant heater in FIG. 1.

As illustrated by a graph Ga in FIG. 8, a theoretical resistance value of the radiant heater 30a has a one-to-one correspondence with a temperature of the radiant heater 30a. The graph Ga represents the theoretical resistance value vs. temperature characteristics of the radiant heater 30a, in which a theoretical resistance value of the radiant heater 30a has a one-to-one correspondence with a temperature of the radiant heater 30a. In this embodiment, a relationship (the graph Ga) between the theoretical resistance value and the temperature of the radiant heater 30a is stored in the flash memory or the like in advance. The theoretical resistance value of the radiant heater 30a is a target resistance value of the radiant heater 30a that is actually mounted in the vehicle.

In this embodiment, a theoretical resistance value Rs having a one-to-one correspondence with a detected temperature from the vehicle interior temperature sensor 40 is obtained from the theoretical resistance value vs. temperature characteristics (the graph Ga) of the radiant heater 30a. The difference between the resistance value R (1) calculated in step 340 and the resistance value Rs of the radiant heater 30a is obtained as the resistance correction value ΔR (=R (1)−Rs). The resistance correction value ΔR is the error of detecting a resistance value of the radiant heater 30a with respect to a temperature thereof. The resistance value vs. temperature characteristics G1 of the radiant heater 30a are obtained by correcting the theoretical resistance value vs. temperature characteristics Ga of the radiant heater 30a with the resistance correction value ΔR.

That is, the resistance value vs. temperature characteristics G1 of the radiant heater 30a are represented by a graph that is obtained by shifting the theoretical resistance value vs. temperature characteristics Ga of the radiant heater 30a by the resistance correction value ΔR along a vertical axis in a coordinate system with the resistance value on the vertical axis and the temperature on a horizontal axis. The resistance value vs. temperature characteristics G1 are represented by a graph illustrating the relationship between the resistance value and the temperature of the radiant heater 30a that is actually mounted in the vehicle.

In the next step 345, the temperature T of the radiant heater 30a is obtained based on the resistance value vs. temperature characteristics G1 and the resistance value R (1) calculated in step 340. The current temperature T of the radiant heater 30a is the detected temperature from the vehicle interior temperature sensor 40.

Thereafter, in step 370, the semiconductor switch element 51 is turned off. Accordingly, the shunt resistor 52 is disconnected from the constant-voltage circuit 54, and the constant-voltage circuit 54 stops outputting a voltage to the radiant heater 30a. In the next step 380, the turn-off of the semiconductor switch element 50 is released. When the heater switch 41 is turned on, the PWM control of the semiconductor switch element 50 is re-started. Thereafter, in step 385, the timer is reset.

In this embodiment, for example, in a state where the semiconductor switch element 50 is turned off and the semiconductor switch element 51 is turned on, current flows from the constant-voltage circuit 54 to the ground via the semiconductor switch element 51, the diode D1, the shunt resistor 52, and the radiant heater 30a for a time of 11 microseconds to 15 microseconds.

Subsequently, the process returns to step 300, and when the heater switch 41 is turned on, it is determined that the occupant operates the heater switch 41 to cause the radiant heater 30a to start radiating radiant heat, and a determination in step 300 is NO.

In the next step 305, it is determined whether an amount of time counted by the timer is greater than or equal to a predetermined time. When an amount of time counted by the timer is greater than or equal to the predetermined time, the determination in step 305 is YES. In this embodiment, for example, a time of 100 microseconds to 300 microseconds is set as the predetermined time.

In the next step 310, it is determined whether the normalized duty ratio "Duty" calculated in steps 250, 260, and 270 illustrated in FIG. 5 is less than 100%. When the normalized duty ratio "Duty" is less than 100%, the determination in step 310 is YES.

Thereafter, the semiconductor switch element 50 is turned off (step 320), and the semiconductor switch element 51 is turned on (step 330). At this time, the microcomputer 20 reads an output voltage from the common connection terminal 55 as the output voltage of the constant-voltage circuit 54, and reads the output voltage of the amplifier circuit 53. A resistance value R (2) of the radiant heater 30a is obtained based on the output voltage of the constant-voltage circuit 54 which has been read, the output voltage of the amplifier circuit 53, and the resistance value of the shunt resistor 52 (step 340).

Subsequently, when it is determined that the execution of step 360 has been completed, and a determination in step 350 is YES. In this case, in the next step 345, the temperature T of the radiant heater 30a, which has a one-to-one correspondence with the resistance value R (2) calculated in step 340, is obtained from the resistance value vs. temperature characteristics G1. The semiconductor switch element 51 is turned off (step 370), and thereafter, the turn-off of the semiconductor switch element 50 is released (step 380).

Thereafter, in step 385, the timer is reset. Subsequently, the process returns to step 300, and when the heater switch 41 is turned on, it is determined as NO. Thereafter, when the determination in step 305 is YES, and then the duty ratio "Duty" is less than 100%, the determination in step 310 is YES. Thereafter, each of steps 320, 330, 340, and 350 is executed. Accordingly, a resistance value R (3) of the radiant heater 30a is obtained. The temperature T of the radiant heater 30a, which has a one-to-one correspondence with the calculated resistance value R (3), is obtained from the resistance value vs. temperature characteristics G1. Thereafter, each of steps 370, 380, and 385 is executed after the determination in step 350 is YES.

Thereafter, the determination in step 305 is YES whenever the heater switch 41 is turned on for an amount of time greater than or equal to the predetermined time. When the duty ratio "Duty" is less than 100%, and the determination in step 310 is YES, steps 320, 330, and 340, a "YES" determination in step 350, step 345, and steps 370, 380, 385, and 390 are repeatedly executed. Then, the temperature T of the radiant heater 30a is obtained whenever step 345 is executed.

Subsequently, the process returns to step 300, and when the heater switch 41 is turned on, the determination in step 300 is NO. When an amount of time counted by the timer is greater than or equal to the predetermined time, the determination in step 305 is YES. When the duty ratio "Duty" is 100%, the determination in step 310 is NO. Subsequently, in step 410, the semiconductor switch element 50 is turned off, and the radiant heater 30a is disconnected from the battery. Then, the semiconductor switch element 51 is turned on, and the shunt resistor 52 is connected to the constant-voltage circuit 54 (step 420).

Subsequently, the microcomputer 20 reads a voltage output from the amplifier circuit 53. The output voltage of the amplifier circuit 53 which has been read is a voltage that is output from the amplifier circuit 53 when it is determined that the duty ratio "Duty" is 100%. In addition, the microcomputer 20 reads a voltage output from the common connection terminal 55 that is disposed between the diode D1 and the shunt resistor 52. The output voltage from the common connection terminal 55 which has been read is a voltage that is output from the common connection terminal 55 when it is determined that the duty ratio "Duty" is 100%.

A resistance value R (M) of the radiant heater 30a is obtained based on the output voltage of the amplifier circuit 53, the output voltage from the common connection terminal 55, and the resistance value of the shunt resistor 52 (step 430). The temperature T of the radiant heater 30a, which has a one-to-one correspondence with the calculated resistance value R (M), is obtained from the resistance value vs. temperature characteristics G1 (step 435).

Similar to step 340, the amount of increase in the temperature of the radiant heater 30a when current flows from the constant-voltage circuit 54 to the ground via the semiconductor switch element 51, the diode D1, the shunt resistor 52, and the radiant heater 30a becomes the amount of temperature increase that cannot be sensed with the skin on the palm of the occupant's hand.

Subsequently, in step 440, the semiconductor switch element 51 is turned off. In the next step 450, the turn-off of the semiconductor switch element 50 is released. At this time, the PWM control of the semiconductor switch element 50 is re-started up. In the next step 460, the timer is reset.

Thereafter, the process returns to step 300, and when it is determined that the heater switch 41 is turned on, the determination in step 300 is NO, and the process proceeds to step 305. When an amount of time counted by the timer is less than the predetermined time, the determination in step 305 is NO, and the process proceeds to END (that is, step 160 in FIG. 4). Thereafter, when an amount of time counted by the timer is greater than or equal to the predetermined time, the determination in step 305 is YES. When the duty ratio "Duty" is 100% at this time, the determination in step 310 is NO. Thereafter, a resistance value R (M+1) of the radiant heater 30a is obtained by executing each of steps 410, 420, and 430. Then, the temperature T of the radiant heater 30a, which has a one-to-one correspondence with the calculated resistance value R (M+1), is obtained from the resistance value vs. temperature characteristics G1 (step 435). Thereafter, each of steps 440, 450, and 460 is executed.

In this manner, the heater temperature calculation process (step 150 in FIG. 4) is repeatedly executed, and the resistance value R of the radiant heater 30a is calculated in step 340 or 430 for every predetermined time period. Accordingly, the temperature T of the radiant heater 30a, which has a one-to-one correspondence with the calculated resistance value R, is obtained from the resistance value vs. temperature characteristics G1 whenever the resistance value R is calculated (steps 345 and 435).

In this embodiment described above, the in-vehicle radiant heater control apparatus 1 includes the microcomputer 20 and the heater drive circuits 10a to 10d. The microcomputer 20 repeatedly obtains the temperatures of the radiant heaters 30a to 30d, and controls the supply of electrical power from the battery to the radiant heaters 30a to 30d such that the obtained temperatures of the radiant heaters 30a to 30d approach the target temperature TSET. The heater drive circuits 10a to 10d are respectively provided for the radiant heaters, and each of the heater drive circuits 10a to 10d includes the semiconductor switch element 50; the shunt resistor 52; the amplifier circuit 53; and the constant-voltage circuit 54. The semiconductor switch elements 50 are disposed between the positive electrode of the battery and the ground, and are respectively connected in series to the radiant heaters 30a to 30d. The electrode 52a of the shunt resistor 52 is connected to the output terminal of the constant-voltage circuit 54, and the electrode 52b of the shunt resistor 52 is connected to the electrode 31a of the radiant heater 30a. The amplifier circuit 53 amplifies the voltage between the electrodes 52a and 52b of the shunt resistor 52, and outputs the amplified voltage to the microcomputer 20. The constant-voltage circuit 54 outputs a constant voltage to the corresponding radiant heater, with the constant voltage being applied between the electrode 52a of the shunt resistor 52 and the electrode 31b of the corresponding one of the radiant heaters 30a to 30d. The microcomputer 20 obtains the resistance value of the corresponding one of the radiant heaters 30a to 30d based on the output voltage of the amplifier circuit 53, the resistance value of the shunt resistor 52, and the output voltage of the constant-voltage circuit 54, and obtains the temperature T of the radiant heater 30a, which has a one-to-one correspondence with the obtained resistance value, from the resistance value vs. temperature characteristics G1.

Accordingly, the resistance value of each of the radiant heaters 30a to 30d can be obtained regardless of the thermal time constant of the thermistor. The temperatures of the radiant heaters 30a to 30d are obtained based on the obtained resistance value of the corresponding one of the radiant heaters 30a to 30d. For this reason, a delay time occurring in the obtainment of the temperature of each of the radiant heaters 30a to 30d can be reduced. Accordingly, a change in the temperature of each of the radiant heaters 30a to 30d can be accurately detected. As a result, the temperatures of the radiant heaters 30a to 30d can be controlled with high accuracy.

In this embodiment, a current path through which current flows from the positive electrode of the battery to the radiant heater 30a via the semiconductor switch element 50 is provided independent of a current path through which current flows from the constant-voltage circuit 54 to the radiant heater 30a via the shunt resistor 52. For this reason, when electrical power is supplied from the battery to the radiant heater 30a, the shunt resistor 52 can be prevented from causing a drop in the voltage that is applied between the electrodes 31a and 32b of the radiant heater 30a. Accordingly, electrical power is efficiently supplied from the battery to the radiant heater 30a.

In this embodiment, the microcomputer 20 obtains the resistance value of each of the radiant heaters 30a to 30d in a state where current flows from the corresponding constant-voltage circuit 54 to the ground via the corresponding shunt resistor 52 and the corresponding one of the radiant heaters 30a to 30d. For this reason, the output voltage of the constant-voltage circuit 54 can be set in such a way that the temperature of the corresponding one of the radiant heaters 30a to 30d is restricted from increasing. As a result, accuracy in the calculation of the resistance values of the radiant heaters 30a to 30d can be improved.

In this embodiment, due to the operation of the timer, the microcomputer 20 executes the steps (steps 345 and 435) of detecting the temperatures of the radiant heaters 30a to 30d for every predetermined period. For this reason, a timing, when the radiant heaters 30a to 30d are disconnected from the battery by means of the semiconductor switch element 50, can be set for every predetermined period such that the temperatures of the radiant heaters 30a to 30d are detected. Accordingly, electrical power can be sufficiently supplied from the battery to the radiant heaters 30a to 30d while the temperatures of the radiant heaters 30a to 30d can be detected.

In this embodiment, the microcomputer 20 obtains the resistance correction value $\Delta R$ (=Rs−R(1)) using the output voltage of the amplifier circuit 53 and the output voltage from the common connection terminal 55 when the temperature of the radiant heater 30a is equal to a vehicle cabin temperature. The microcomputer 20 obtains the graph G1 as the resistance value vs. temperature characteristics G1, with the graph G1 being acquired by correcting the theoretical resistance value vs. temperature characteristics Ga of the radiant heater 30a with the resistance correction value ΔR. The resistance value vs. temperature characteristics G1 are represented by a graph illustrating the relationship between the resistance value and the temperature of the radiant heater 30a that is actually mounted in the vehicle. The temperature T of the radiant heater 30a, which has a one-to-one correspondence with the resistance value of the radiant heater 30a, can be obtained from the resistance value vs. temperature characteristics G1. As a result, the temperatures of the radiant heaters 30a to 30d can be obtained with high accuracy.

In this embodiment, it is assumed that the heater switch 41 is turned off, and the temperatures of the radiant heaters 30a to 30d are equal to an air temperature in the vehicle cabin when the in-vehicle radiant heater control apparatus 1 is initially connected to the battery at a vehicle factory and the like.

In this embodiment, the microcomputer 20 determines whether the calculation of the resistance correction value ΔR is completed in step 350 whenever the resistance value of the radiant heater 30a is calculated in step 340. For this reason, when the in-vehicle radiant heater control apparatus 1 is initially connected to the battery, and then the heater switch 41 is turned off in step 300 of a first cycle, the determination is YES, and when the calculation of the resistance correction value ΔR is not completed in step 350 of the first cycle, the determination is NO. Accordingly, when electrical power is initially supplied from the battery to the in-vehicle radiant heater control apparatus 1, it can be determined that the temperatures of the radiant heaters 30a to 30d are equal to the air temperature in the vehicle cabin, and the resistance correction value ΔR can be calculated. As a result, a high-accurate resistance correction value ΔR can be obtained.

In this embodiment, the microcomputer 20 allows current to flow from the constant-voltage circuit 54 to the ground via the shunt resistor 52 and the radiant heater 30a so as to obtain the resistance values of the radiant heaters 30a to 30d in steps 340 and 430. At this time, the temperature of the radiant heater 30a to 30d increases due to current flowing from the constant-voltage circuit 54 to the shunt resistor 52 and the radiant heater 30a. The amount of temperature increase cannot be sensed with the skin on the palm of the occupant's hand by properly setting the output voltage of the constant-voltage circuit 54 and the resistance value of the shunt resistor 52. For this reason, when the resistance values of the radiant heaters 30a to 30d are detected, even if the palm of the occupant's hand comes into contact with the radiant heaters 30a to 30d, the occupant cannot feel uncomfortable.

According to NPL 1, the threshold of a temperature sensed with the palm of a human's hand is approximately 0.2° C. That is, the skin on the palm of a human's hand can sense a temperature increase of 0.2° C. The sensible temperature threshold is the amount of temperature increase that the skin on the palm of a human's hand can sense as a temperature increase. That is, the skin on the palm of a human's hand cannot sense a temperature increase of less than 0.2° C.

NPL 1: Iwamura Yoshiaki: Touch (title of book): Published by Igaku-Shoin Ltd.: [Stevens J C, Choo K K: Somatosens Mot Res 15: 13-28, 1998 Temperature sensitivity of the body surface over the life span]

As described above, if the amount of temperature increase, which occurs in each of the radiant heaters 30a to 30d when current flows from the constant-voltage circuit 54 to the ground via the shunt resistor 52 and the corresponding one of the radiant heaters 30a to 30d, is less than 0.2° C., and the temperature is saturated, the amount of temperature increase of each of the radiant heaters 30a to 30d does not cause the occupant to feel uncomfortable.

In this embodiment, in order to reliably prevent a temperature increase from causing the occupant to feel uncomfortable, the amount Δt of temperature increase, which occurs in each of the radiant heaters 30a to 30d when current flows from the constant-voltage circuit 54 to the shunt resistor 52 and the corresponding one of the radiant heaters 30a to 30d, is restricted to be less than or equal to 0.1° C.

Hereinafter, in this embodiment, the resistance value of the shunt resistor 52 or the output voltage of the constant-voltage circuit 54, which is required to restrict the amount Δt of temperature increase of the corresponding one of the radiant heaters 30a to 30d to be less than 0.1° C., will be examined. Hereinafter, the radiant heater 30a of the radiant heaters 30a to 30d will be representatively described.

First, an internal resistor of the radiant heater 30a is 1.2Ω. The radiant heater 30a has heater characteristics in which the temperature of the radiant heater 30a increases from a vehicle cabin temperature of 0° C., and is saturated at 100° C. when a voltage of 12 V is applied between both of the electrodes of the radiant heater 30a, and a heater current of 10 A flows to the radiant heater 30a. In this case, a thermal resistance θ of the radiant heater 30a is represented as follows.

First, when Q is assumed to be the electrical power of the radiant heater, Expression 2 representing the relationship between Q, Δt, and θ is established.

$$\theta = \Delta t / Q \quad \text{(Expression 2)}$$

Here, since Q=12 V×10 A, and Δt=100, the thermal resistance θ=100/(12×10)=5/6[° C./W]

Subsequently, the resistance value of the shunt resistor 52 is assumed to be r2, and the resistance value of the radiant heater 30a is assumed to be R. In addition, when the constant-voltage circuit 54 applies a voltage of E between the electrode 52a of the shunt resistor 52 and the electrode 31b of each of the radiant heaters 30a to 30d, Expression 3 is established.

$$5/6 = 0.1/((E/(r2+R))^2 \cdot R) \quad \text{(Expression 3)}$$

Here, when R=1.2Ω, r2=E×√10−1.2

For this reason, heater current Ih can be represented by Expression 4.

$$Ih = E/(r2+R) = \sqrt{10}/10 = 0.316 \, [A] \quad \text{(Expression 4)}$$

For example, when E=5 V, r2=14.6Ω, and when E=12 V, r2=36.7 Ω

That is, when Ih≤0.316 A, the amount Δt of temperature increase is less than or equal to 0.1° C. For this reason, when the output voltage E of the constant-voltage circuit 54 and the resistance value r2 of the shunt resistor 52 are selected in this manner, a human cannot detect a temperature increase of the radiant heater 30a.

The heater current value Ih, at which the temperature increase cannot be sensed with the palm of a human's hand, is calculated from the heater characteristics, and the resistance value R of each of the radiant heaters 30a to 30d is obtained using this current value, and thus the temperature of the radiant heater 30a can be detected with a small error of temperature increase that cannot be sensed by a human.

Second Embodiment

In the first embodiment, when the duty ratio "Duty" is 100%, in step 430, the resistance value of the shunt resistor 52 is obtained based on the output voltage of the constant-voltage circuit 54, and in contrast, in a second embodiment, the resistance value of the shunt resistor 52 is obtained using the output voltage of the battery.

The in-vehicle radiant heater control apparatus 1 in this embodiment is different in the circuit configuration of the heater drive circuits 10a to 10d from the in-vehicle radiant heater control apparatus 1 in the first embodiment.

Figure 9:
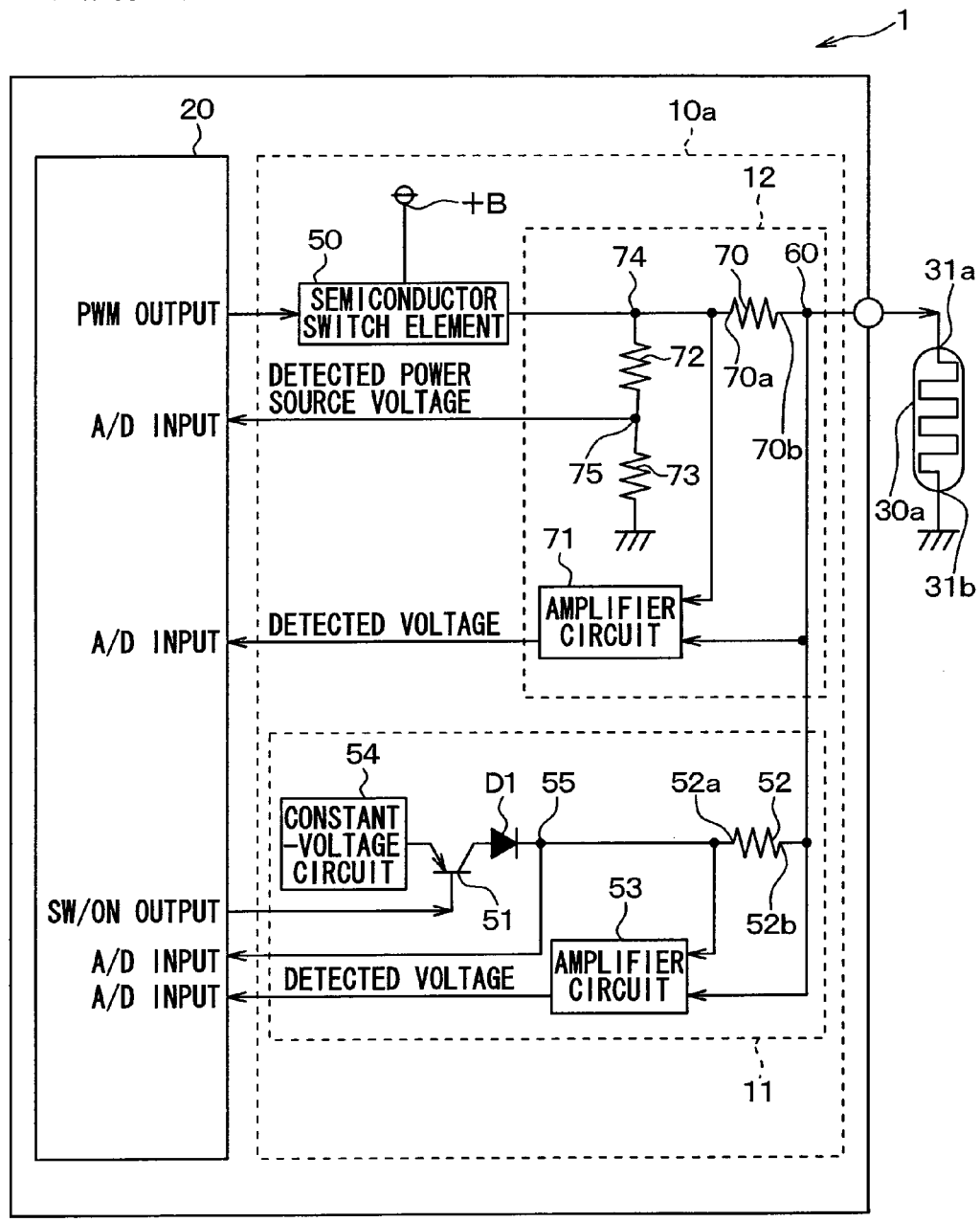
FIG. 9 is a circuit diagram illustrating the configuration of a heater drive circuit in a second embodiment of this disclosure.

In this embodiment, the heater drive circuits 10a to 10d have the same configuration. The configuration of the heater drive circuit 10a of the heater drive circuits 10a to 10d will be representatively described with reference to FIG. 9. FIG. 9 illustrates the circuit configuration of the heater drive circuit 10a in this embodiment.

In this embodiment, the heater drive circuit 10a has a configuration in which a detection circuit 12 is added to the heater drive circuit 10a in FIG. 3.

The detection circuit 12 includes a shunt resistor 70; an amplifier circuit 71; and resistive elements 72 and 73. The shunt resistor 70 is a second resistive element, an electrode 70a of which is connected to the output terminal of the semiconductor switch element 50. An electrode 70b of the shunt resistor 70 is connected to the electrode 31a of the radiant heater 30a via the common connection terminal 60. The shunt resistor 70 is a resistive element that is used to detect current flowing from the battery to the radiant heater 30a. The amplifier circuit 71 amplifies the voltage between the electrodes 70a and 70b of the shunt resistor 70, and inputs the amplified voltage to the microcomputer 20.

The resistive elements 72 and 73 are connected in series to each other between the ground and a common connection terminal 74 that is disposed between the semiconductor switch element 50 and the shunt resistor 70. The resistive element 73 is disposed closer to the ground than the resistive element 72. The resistive elements 72 and 73 form a voltage divider circuit in which the output voltage of the semiconductor switch element 50 is divided, and the divided voltage is output to the microcomputer 20 from a common connection terminal 75 between the resistive elements 72 and 73. The voltage divider circuit is used to detect the voltage of the battery, which is applied between the electrode 70a of the shunt resistor 70 and the electrode 31b of the radiant heater 30a. Except for the detection circuit 12, the remainders of the configuration of the heater drive circuit 10a in FIG. 9 are the same as that of the heater drive circuit 10a in FIG. 3, and thus description thereof will be omitted.

Figure 10:
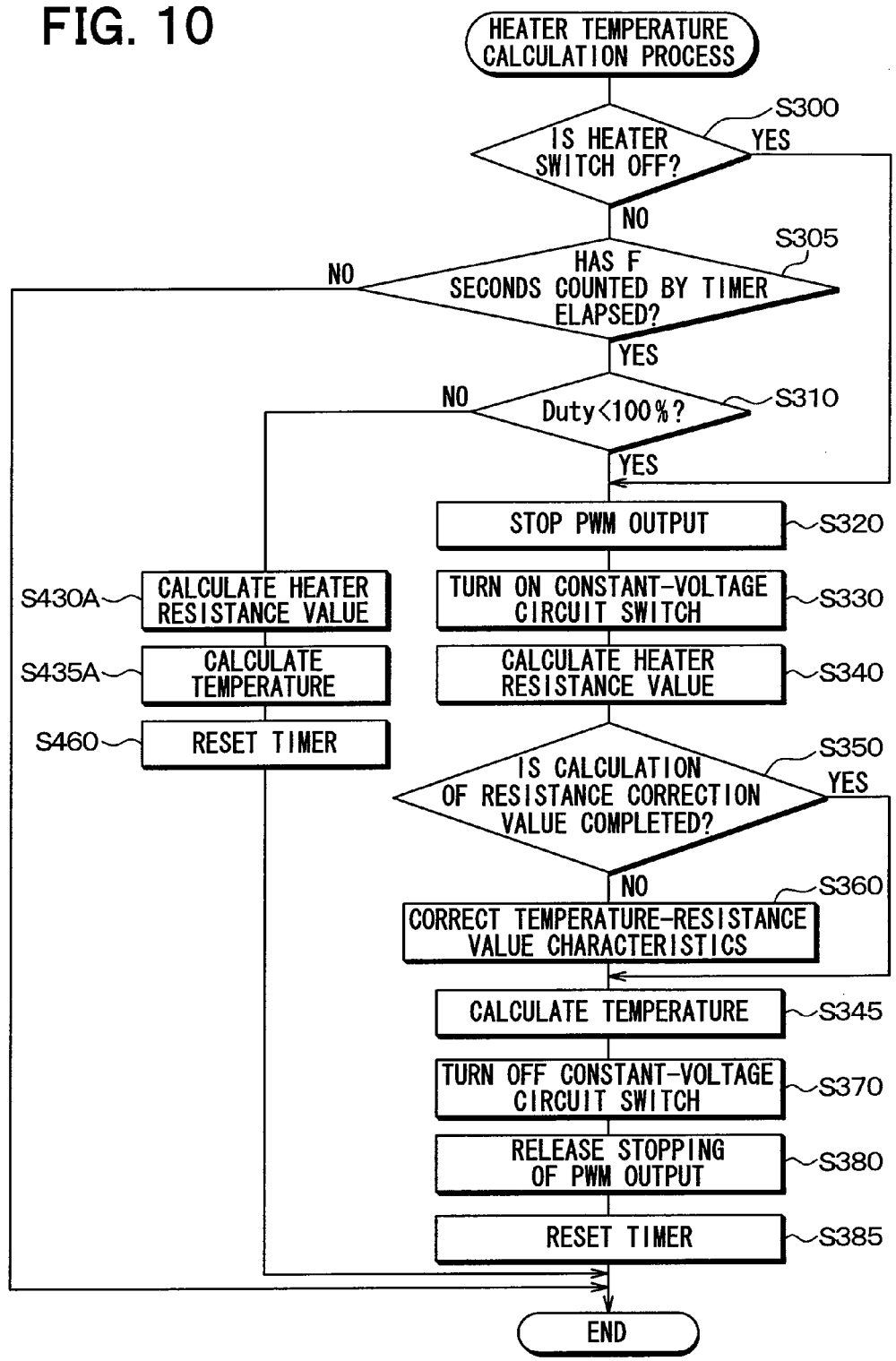
FIG. 10 is a flowchart illustrating a heater temperature calculation process in the second embodiment.

Hereinafter, in this embodiment, a main temperature control process executed by the microcomputer 20 will be described with reference to FIG. 10. FIG. 10 is a flowchart illustrating a heater temperature calculation process in this embodiment.

First, the heater temperature calculation process (step 150 in FIG. 4) included in the main temperature control process in this embodiment is different from that included in the main temperature control process in the first embodiment. The point of difference between the heater temperature calculation processes in this embodiment and the first embodiment is a step of obtaining the resistance value R of the radiant heater 30a when in step 310, the duty ratio "Duty" is 100%, and the determination is NO.

In the heater temperature calculation process in this embodiment, instead of steps 410 to 450 in FIG. 6, steps 430A and 435A are used to obtain the resistance value R (M) of the radiant heater 30a when the determination in step 310 is NO. Steps 320 to 385 in FIG. 10 are the same as steps 320 to 385 in FIG. 6.

In step 430A illustrated in FIG. 10, the microcomputer 20 reads a voltage that is output from the amplifier circuit 71 when it is determined that the duty ratio "Duty" is 100%, and reads a voltage that is output from the common connection terminal 75 when it is determined that the duty ratio "Duty" is 100%.

The output voltage of the amplifier circuit 71 represents the voltage between the electrodes 70a and 70b of the shunt resistor (the second resistive element) 70. An output voltage from a common connection terminal 74 represents the output voltage of the battery, which is applied between the electrode 70a of the shunt resistor 70 and the electrode 31b of the radiant heater 30a. The output voltage from the common connection terminal 75 is an output voltage of the voltage divider circuit, which is produced by dividing the output voltage of the common connection terminal 74 with the resistive elements 72 and 73. The resistance value of the radiant heater 30a is obtained based on the output voltage of the amplifier circuit 71, the output voltage from the common connection terminal 75, and the resistance value of the shunt resistor (the second resistive element) 70.

Specifically, the microcomputer 20 obtains the current I flowing from the battery to the ground via the shunt resistor 70 and the radiant heater 30a, based on the output voltage of the amplifier circuit 71 and the resistance value of the shunt resistor 70. The resistance value of the shunt resistor 70 is stored in the flash memory or the like in advance. The microcomputer 20 obtains the resistance value of the radiant heater 30a based on the current I, the output voltage from the common connection terminal 75, and the output voltage of the amplifier circuit 71. The temperature T of the radiant heater 30a, which has a one-to-one correspondence with the resistance value of the radiant heater 30a, is obtained from the resistance value vs. temperature characteristics G1 (step 435A).

In this embodiment, each of the heater drive circuits 10a to 10d includes the detection circuit 12 in addition to the semiconductor switch element 50 and the detection circuit 11. In the detection circuit 12, the electrode 70a of the shunt resistor 70 is connected to the output terminal of the semiconductor switch element 50, and the electrode 70b of the shunt resistor 70 is connected to the electrode 31a of the radiant heater 30a. The amplifier circuit 71 amplifies the voltage between the electrodes 70a and 70b of the shunt resistor 70, and outputs the amplified voltage to the microcomputer 20. When it is determined that the duty ratio "Duty" is less than 100%, similar to the first embodiment, the microcomputer 20 obtains the resistance value of each of the radiant heaters 30a to 30d using the shunt resistor 52 of the detection circuit 11. When it is determined that the duty ratio "Duty" is 100%, the microcomputer 20 obtains the resistance value of each of the radiant heaters 30a to 30d using the shunt resistor 70 of the detection circuit 12. Since the temperatures of the radiant heaters 30a to 30d are obtained based on the obtained resistance values of the radiant heaters 30a to 30d, similar to the first embodiment, the temperatures of the radiant heaters 30a to 30d can be controlled with high accuracy.

In this embodiment, when it is determined that the duty ratio "Duty" is 100%, the resistance value of the radiant heater 30a is obtained using voltages output from the common connection terminal 75 and the amplifier circuit 71. That is, while the semiconductor switch element 50 is turned on over a predetermined time, the resistance value of the radiant heater 30a is obtained using the voltages output from the common connection terminal 75 and the amplifier circuit 71. For this reason, the microcomputer 20 does not require a process in which a timing, when the microcomputer 20 reads the output voltage from the common connection terminal 75 and the output voltage of the amplifier circuit 71, coincides with a timing when the semiconductor switch element 50 is turned on. Accordingly, the microcomputer 20 can detect the output voltage from the common connection terminal 75 and the output voltage of the amplifier circuit 71 using the output voltage of the battery in a simple process.

In this embodiment, due to the operation of the timer, the microcomputer 20 executes the steps (steps 345 and 345A) of detecting the temperatures of the radiant heaters 30a to 30d for every predetermined period. Accordingly, similar to the first embodiment, electrical power can be sufficiently supplied from the battery to the radiant heaters 30a to 30d while the temperatures of the radiant heaters 30a to 30d can be detected.

Other Embodiments

In the first and second embodiments, when the determination in step 300 is YES, and the determination in step 350 is NO, it is determined that the temperatures of the radiant heaters 30a to 30d are equal to the air temperature in the vehicle cabin, and alternatively, the determination may be made in the following conditions.

That is, when an amount of time elapsed from the stopping of operation of each of the radiant heaters 30a to 30d is counted for the radiant heater by the timer, and an amount of time counted by the timer is greater than or equal to a predetermined time, it may be determined that the temperatures of the radiant heaters 30a to 30d are equal to the air temperature in the vehicle cabin.

In this case, in order to restrict the number of times the resistance correction value ΔR is calculated, when an amount of time counted by the timer is greater than or equal to the predetermined time, and a detected temperature of the vehicle interior temperature sensor 40 is lower than or equal to a predetermined temperature, it may be determined that the temperatures of the radiant heaters 30a to 30d are equal to the air temperature in the vehicle cabin, and the resistance correction value ΔR may be calculated. Accordingly, when the air temperature in the vehicle cabin is high, and the radiant heaters 30a to 30d are not required to be used, the calculation of the resistance correction value ΔR can be prevented in advance.

In the first and second embodiments, the microcomputer 20 reads an output voltage from the common connection terminal 55, and takes the read voltage as the output voltage of the constant-voltage circuit 54, and alternatively, the output voltage of the constant-voltage circuit 54 may be determined as follows. That is, the output voltage of the constant-voltage circuit 54 is stored in a memory in advance, and the resistance value of each of the radiant heaters 30a to 30d is obtained using the stored voltage.

In the first and second embodiments, the battery is used as a power supply, and alternatively, others than the battery may be used as power supplies.

In the first and second embodiments, the radiant heaters 30a to 30d radiate radiant heat to a driver; however, this disclosure is not limited to that configuration, and the radiant heaters 30a to 30d may radiate radiant heat to occupants sitting on a front passenger seat or rear seats.

In the first and second embodiments, the semiconductor switch element 50 is PWM controlled such that the supply of electrical power from the battery to the radiant heaters 30a to 30d is controlled, and alternatively, the supply of electrical power from the battery to the radiant heaters 30a to 30d may be controlled using control methods other than PWM control.

In the first and second embodiments, the voltage between the electrodes 52a and 52b of the shunt resistor 52 is provided to the microcomputer 20 via the amplifier circuit 53, and alternatively, the voltage between the electrodes 52a and 52b of the shunt resistor 52 may be directly provided to the microcomputer 20 without passing through the amplifier circuit 53.

In the second embodiment, an output voltage from the common connection terminal 75 is detected as the output voltage of the battery, and the resistance value of the radiant heater 30a is obtained using the detected voltage, and alternatively, the output voltage of the battery may be detected as follows.

That is, the output voltage of the battery is stored in a memory in advance, and the resistance value of the radiant heater 30a may be obtained using the stored output voltage of the battery.

In the first and second embodiments, the microcomputer 20 executes the main temperature control process for each of the radiant heaters 30a to 40d in a time-division manner, and alternatively, the microcomputer 20 may execute the main temperature control process for the radiant heaters 30a to 40d at the same time.

In the first and second embodiments, the amount Δt of temperature increase, which occurs in each of the radiant heaters 30a to 30d when current flows from the constant-voltage circuit 54 to the shunt resistor 52 and the corresponding one of the radiant heaters 30a to 30d, is restricted to be less than or equal to 0.1° C., and alternatively, the amount Δt of temperature increase may be restricted as follows.

That is, the amount Δt of temperature increase is not limited to be less than or equal to 0.1° C. insofar the amount Δt of temperature increase is less than 0.2° C.

In the second embodiment, the voltage between the electrodes 70a and 70b of the shunt resistor 70 is provided to the microcomputer 20 via the amplifier circuit 71, and alternatively, the voltage between the electrodes 70a and 70b of the shunt resistor 70 may be provided to the microcomputer 20 without passing through the amplifier circuit 71.

In the second embodiment, when the duty ratio "Duty" is 100%, the resistance values of the radiant heaters 30a to 30d are obtained using the resistive element 70, and alternatively, when the duty ratio "Duty" is less than 100%, the resistance values of the radiant heaters 30a to 30d may be obtained using the resistive element 70.

In the first and second embodiments, a flash memory is used as storage device for storing the theoretical resistance value vs. temperature characteristics Ga of the radiant heater 30a and the like, and the storage device is not limited to a flash memory, and various non-volatile memories other than a flash memory may be used as the storage device for storing the theoretical resistance value vs. temperature characteristics Ga of the radiant heater 30a and the like.

In the first and second embodiments, current flows from the constant-voltage circuit 54 to the shunt resistor 52 and the radiant heater 30a for a time of 11 microseconds to 15 microseconds, and alternatively, the amount of time for which current flows from the constant-voltage circuit 54 to the shunt resistor 52 and the radiant heater 30a may not be a time of 11 microseconds to 15 microseconds.

In the first and second embodiments, the predetermined time specified for the determination in step 305 is 100 microseconds to 300 microseconds, and alternatively, the predetermined time specified for the determination in step 305 may not be 100 microseconds to 300 microseconds.

Steps 345 and 435 in the first embodiment correspond to temperature detection device, steps 345 and 435A in the second embodiment correspond to temperature detection device, and steps 200 to 280 in the first and second embodiments form temperature control device. Step 340 forms resistance value calculation device and electrode-to-electrode voltage detection device. Step 430 forms resistance value calculation device and electrode-to-electrode voltage detection device. Step 430A forms resistance value calculation device and electrode-to-electrode voltage detection device. Each of steps 320 and 410 corresponds to first switch control device, and each of steps 330 and 420 corresponds to second switch control device. Each of steps 340 and 430 corresponds to circuit output voltage detection device. Steps 200 to 270 form duty ratio calculation device. Step 280 corresponds to PWM control device. Step 310 corresponds to duty ratio determination device. Steps 300 and 350 form temperature determination device. Step 360 forms characteristics calculation device. Step 300 corresponds to operation determination device. Step 350 corresponds to calculation completion determination device. Step 430A corresponds to power source voltage detection device.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle radiant heater control apparatus comprising:
   a temperature detection device that repeatedly obtains heater temperature of a radiant heater for radiating radiant heat to an occupant in a compartment of a vehicle;
   a first switch element that is disposed between a power supply and a ground, and is connected in series to the radiant heater;
   a temperature control device that controls the first switch element based on the heater temperature detected by the temperature detection device every time the temperature detection device obtains the heater temperature of the radiant heater, and controls an electric power to be supplied from the power supply to the radiant heater via the first switch element in such a way that the heater temperature of the radiant heater approaches a target temperature;
   a resistive element that has a first electrode and a second electrode, one of which is connected to one of two electrodes of the radiant heater;
   an inter-electrode voltage detection device that detects a resistance voltage between the first electrode and the second electrode of the resistive element;
   a resistance value calculation device that repeatedly obtains a heater resistance value of the radiant heater based on a voltage between the other of the first electrode and the second electrode of the resistive element and the other of the two electrodes of the radiant heater, the resistance voltage detected by the inter-electrode voltage detection device, and a resistance value of the resistive element:
   a constant-voltage circuit that outputs a constant voltage to the radiant heater;
   a second switch element that is disposed between the constant-voltage circuit and the radiant heater;
   a first switch control device that controls the first switch element that the radiant heater is disconnected from the power supply; and
   a second switch control device that controls the second switch element that the radiant heater is connected to the constant-voltage circuit, wherein:
   the temperature detection device obtains the heater temperature of the radiant heater based on the heater resistance value obtained by the resistance value calculation device;
   the resistive element is disposed between the constant-voltage circuit and the radiant heater, and provides a first resistive element;
   the inter-electrode voltage detection device detects the resistance voltage between the first electrode and the second electrode of the first resistive element in a state where the first switch control device controls the first switch element to disconnect between the radiant heater and the power supply, and the second switch control device controls the second switch element to connect between the radiant heater and the constant-voltage circuit;
   the resistance value calculation device obtains the heater resistance value of the radiant heater based on the resistance voltage detected by the inter-electrode voltage detection device, a first resistance value of the first resistive element, and an output constant voltage of the constant-voltage circuit; and
   a current path, through which current flows from the power supply to the radiant heater via the first switch element, is arranged independently from a current path, through which current flows from the constant-voltage circuit to the radiant heater via the first resistive element.

2. The in-vehicle radiant heater control apparatus according to claim 1, further comprising:
   a circuit output voltage detection device that detects the output constant voltage, which is output from the constant-voltage circuit to the first resistive element and the corresponding radiant heater, wherein:
   the resistance value calculation device obtains the heater resistance value of the radiant heater based on the output constant voltage detected by the circuit output voltage detection device, the resistance voltage detected by the inter-electrode voltage detection device, and the first resistance value of the first resistive element.

3. The in-vehicle radiant heater control apparatus according to claim 1, further comprising:
   a characteristics calculation device that obtains a resistance-temperature characteristic indicative of a relationship for specifying a one-on-one correspondence between the heater temperature of the radiant heater and the heater resistance value of the radiant heater actually mounted in the vehicle, wherein:

the temperature detection device obtains the heater temperature of the radiant heater, which is specified by the one-on-one correspondence with respect to the resistance value of the radiant heater obtained by the resistance value calculation device, based on the resistance-temperature characteristic.

4. The in-vehicle radiant heater control apparatus according to claim 1, wherein:

the resistance value calculation device calculates the heater resistance value of the radiant heater at every predetermined cycle; and every time the resistance value calculation device calculates the heater resistance value of the radiant heater, the temperature detection device obtains the heater temperature of the radiant heater based on the heater resistance value of the radiant heater, which is calculated by the resistance value calculation device.

5. An in-vehicle radiant heater control apparatus comprising:

a temperature detection device that repeatedly obtains heater temperature of a radiant heater for radiating radiant heat to an occupant in a compartment of a vehicle;

a first switch element that is disposed between a power supply and a ground, and is connected in series to the radiant heater;

a temperature control device that controls the first switch element based on the heater temperature detected by the temperature detection device every time the temperature detection device obtains the heater temperature of the radiant heater, and controls an electric power to be supplied from the power supply to the radiant heater via the first switch element in such a way that the heater temperature of the radiant heater approaches a target temperature;

a resistive element that has a first electrode and a second electrode, one of which is connected to one of two electrodes of the radiant heater;

an inter-electrode voltage detection device that detects a resistance voltage between the first electrode and the second electrode of the resistive element;

a resistance value calculation device that repeatedly obtains a heater resistance value of the radiant heater based on a voltage between the other of the first electrode and the second electrode of the resistive element and the other of the two electrodes of the radiant heater, the resistance voltage detected by the inter-electrode voltage detection device, and a resistance value of the resistive element;

a constant-voltage circuit that outputs a constant voltage to the radiant heater;

a second switch element that is disposed between the constant-voltage circuit and the radiant heater;

a first switch control device that controls the first switch element that the radiant heater is disconnected from the power supply; and a second switch control device that controls the second switch element that the radiant heater is connected to the constant-voltage circuit, wherein:

the temperature detection device obtains the heater temperature of the radiant heater based on the heater resistance value obtained by the resistance value calculation device;

the resistive element is disposed between the constant-voltage circuit and the radiant heater, and provides a first resistive element;

the inter-electrode voltage detection device detects the resistance voltage between the first electrode and the second electrode of the first resistive element in a state where the first switch control device controls the first switch element to disconnect between the radiant heater and the power supply, and the second switch control device controls the second switch element to connect between the radiant heater and the constant-voltage circuit;

the resistance value calculation device obtains the heater resistance value of the radiant heater based on the resistance voltage detected by the inter-electrode voltage detection device, a first resistance value of the first resistive element, and an output constant voltage of the constant-voltage circuit; and the first resistance value of the first resistive element and the output constant voltage of the constant-voltage circuit are controlled in such a way that an amount of temperature increase of the radiant heater due to an electrical power supplied from the constant-voltage circuit to the radiant heater is set to be an amount of temperature increase not to be sensed with a skin on a palm of the occupant in a state where the first switch control device controls the first switch element to disconnect between the radiant heater and the power supply, and the second switch control device controls the second switch element to connect between the radiant heater and the constant-voltage circuit, wherein:

the amount of temperature increase not to be sensed with the skin on the palm of the occupant is equal to 0.2° C.

6. The in-vehicle radiant heater control apparatus according to claim 5, wherein:

the amount of temperature increase of the radiant heater due to the electrical power supplied from the constant-voltage circuit to the radiant heater is equal to or less than 0.1° C.

7. An in-vehicle radiant heater control apparatus comprising:

a temperature detection device that repeatedly obtains heater temperature of a radiant heater for radiating radiant heat to an occupant in a compartment of a vehicle;

a first switch element that is disposed between a power supply and a ground, and is connected in series to the radiant heater;

a temperature control device that controls the first switch element based on the heater temperature detected by the temperature detection device every time the temperature detection device obtains the heater temperature of the radiant heater, and controls an electric power to be supplied from the power supply to the radiant heater via the first switch element in such a way that the heater temperature of the radiant heater approaches a target temperature;

a resistive element that has a first electrode and a second electrode, one of which is connected to one of two electrodes of the radiant heater;

an inter-electrode voltage detection device that detects a resistance voltage between the first electrode and the second electrode of the resistive element;

a resistance value calculation device that repeatedly obtains a heater resistance value of the radiant heater based on a voltage between the other of the first electrode and the second electrode of the resistive element and the other of the two electrodes of the radiant heater, the resistance voltage detected by the inter-electrode voltage detection device, and a resistance value of the resistive element;

a characteristics calculation device that obtains a resistance-temperature characteristic indicative of a relationship for specifying a one-on-one correspondence between the heater temperature of the radiant heater and the heater resistance value of the radiant heater actually mounted in the vehicle;

a vehicle compartment air-temperature detection device that detects an air temperature in the compartment of the vehicle;

a temperature determination device that determines whether the heater temperature of the radiant heater is equal to the air temperature in the compartment of the vehicle;

a calculation device that calculates the heater resistance value of the radiant heater based on the resistance voltage between the first electrode and the second electrode of the first resistive element detected by the inter-electrode voltage detection device, the resistance value of the resistive element, and the output constant voltage of the constant-voltage circuit, when the temperature determination device determines that the heater temperature of the radiant heater is equal to the air temperature in the compartment of the vehicle; and a storage device that stores a theoretical resistance-temperature characteristic indicative of a relationship for specifying a one-on-one correspondence between the heater temperature of the radiant heater and a theoretical heater resistance value of the radiant heater, wherein:

the temperature detection device obtains the heater temperature of the radiant heater based on the heater resistance value obtained by the resistance value calculation device;

the temperature detection device obtains the heater temperature of the radiant heater, which is specified by the one-on-one correspondence with respect to the resistance value of the radiant heater obtained by the resistance value calculation device, based on the resistance-temperature characteristic; and when the temperature determination device determines that the heater temperature of the radiant heater is equal to the air temperature in the compartment of the vehicle, the characteristics calculation device: obtains the theoretical heater resistance value of the radiant heater, which is specified by the one-on-one correspondence with respect to a detected air temperature in the compartment detected by the vehicle compartment air-temperature detection device, based on the theoretical resistance-temperature characteristic; obtains a difference between an obtained theoretical heater resistance value and the heater resistance value calculated by the calculation device as a correction value; and obtains the resistance-temperature characteristic by correcting the theoretical resistance-temperature characteristic with an obtained correction value.

8. The in-vehicle radiant heater control apparatus according to claim 7, further comprising:
a heater switch that is operated by the occupant in order to start radiating the radiant heat using the radiant heater;

an operation determination device that determines whether the occupant operates the heater switch in order to start radiating the radiant heat using the radiant heater; and a calculation completion determination device that determines whether a calculation of the correction value is completed, every time the resistance value calculation device calculates the heater resistance value of the radiant heater, wherein:

when the calculation completion determination device determines that the calculation of the correction value is not completed yet, and the operation determination device determines that the occupant does not operate the heater switch in order to start radiating the radiant heat using the radiant heater, the temperature determination device determines that the heater temperature of the radiant heater is equal to the air temperature in the compartment of the vehicle.

9. The in-vehicle radiant heater control apparatus according to claim 8, wherein:
when the operation determination device determines that the occupant operates the heater switch in order to start radiating the radiant heat using the radiant heater, the temperature control device starts controlling the first switch element.

10. The in-vehicle radiant heater control apparatus according to claim 7, wherein:
the temperature control device further includes:
a duty ratio calculation device that repeatedly calculates a duty ratio in such a way that the heater temperature of the radiant heater approaches the target temperature, based on the heater temperature detected by the temperature detection device, when a time calculated by a sum of an on-time and an off-time of the first switch element is defined as a predetermined period, and the duty ratio represents a ratio in percentage between the on-time and the predetermined period; and a PWM control device that controls to supply the electrical power from the power supply to the radiant heater by controlling the first switch element in order to provide the duty ratio calculated by the duty ratio calculation device using the first switch element every time the duty ratio calculation device calculates the duty ratio.

11. The in-vehicle radiant heater control apparatus according to claim 10, wherein:
the resistive element is disposed between the constant-voltage circuit and the radiant heater, and provides a first resistive element; and the resistive element includes a second resistive element that is connected between the first switch element and the radiant heater, the in-vehicle radiant heater control apparatus further comprising:
a duty ratio determination device that determines whether the duty ratio calculated by the duty ratio calculation device is equal to 100%; and a power source voltage detection device that detects a voltage, which is supplied from the power supply to the second resistive element and the radiant heater, when the duty ratio determination device determines that the duty ratio is equal to 100%, wherein:

when the duty ratio determination device determines that the duty ratio is equal to 100%, the resistance value calculation device obtains the heater resistance value of the radiant heater based on a second resistance voltage between two electrodes of the second resistive element detected by the inter-electrode voltage detection device, the voltage detected by the power source voltage detection device, and a second resistance value of the second resistive element when the duty ratio determination device determines that the duty ratio is equal to 100%; and when the duty ratio determination device determines that the duty ratio is less than 100%, the resistance value calculation device obtains the heater resistance value of the radiant heater based on the first resistance voltage between the first electrode and the second electrode of the first resistive element detected by the inter-electrode voltage detection device, the output constant voltage of the constant-voltage circuit, and the first resistance value of the first resistive element when the duty ratio determination device determines that the duty ratio is less than 100%.

* * * * *